(12) United States Patent
Deguchi et al.

(10) Patent No.: US 9,164,347 B2
(45) Date of Patent: Oct. 20, 2015

(54) DISPLAY DEVICE INCLUDING ELECTROCHROMIC LAYER

(75) Inventors: Kazuhiro Deguchi, Osaka (JP); Eiji Satoh, Osaka (JP); Akio Miyata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 219 days.

(21) Appl. No.: 13/994,942

(22) PCT Filed: Dec. 13, 2011

(86) PCT No.: PCT/JP2011/078794
§ 371 (c)(1),
(2), (4) Date: Jun. 17, 2013

(87) PCT Pub. No.: WO2012/086468
PCT Pub. Date: Jun. 28, 2012

(65) Prior Publication Data
US 2013/0265629 A1     Oct. 10, 2013

(30) Foreign Application Priority Data
Dec. 20, 2010  (JP) ................. 2010-282606

(51) Int. Cl.
| | | |
|---|---|---|
| *G02F 1/153* | (2006.01) | |
| *G02F 1/155* | (2006.01) | |
| *B82Y 30/00* | (2011.01) | |
| *G02F 1/15* | (2006.01) | |

(52) U.S. Cl.
CPC ............... *G02F 1/155* (2013.01); *B82Y 30/00* (2013.01); *G02F 1/1521* (2013.01); *G02F 1/1523* (2013.01); *G02F 2001/1512* (2013.01); *G02F 2202/04* (2013.01); *G02F 2202/36* (2013.01); *G02F 2202/38* (2013.01); *G02F 2203/01* (2013.01)

(58) Field of Classification Search
CPC ........ G02F 1/1521; G02F 1/155; G02F 1/153
See application file for complete search history.

(56) References Cited

U.S. PATENT DOCUMENTS

| | | | | |
|---|---|---|---|---|
| 6,067,184 | A * | 5/2000 | Bonhote et al. ............... | 359/265 |
| 7,181,134 | B2 * | 2/2007 | Kaneiwa et al. ............... | 359/265 |
| 7,830,582 | B2 * | 11/2010 | Morita et al. ................. | 359/265 |

FOREIGN PATENT DOCUMENTS

| | | |
|---|---|---|
| JP | 05-098251 A | 4/1993 |
| JP | 2004-151265 A | 5/2004 |
| JP | 2008-203740 A | 9/2008 |

OTHER PUBLICATIONS

Official Communication issued in International Patent Application No. PCT/JP2011/078794, mailed on Jan. 24, 2012.
Satoh et al., "Display Device", U.S. Appl. No. 13/994,937, filed Jun. 17, 2013.

(Continued)

*Primary Examiner* — Zachary Wilkes
(74) *Attorney, Agent, or Firm* — Keating & Bennett, LLP (57) ABSTRACT

A display device (100A) according to the present invention includes a first substrate (11), a second substrate (21) facing the first substrate (11), a first electrode (15) formed on the first substrate (11), a second electrode (25) formed on the second substrate (21), and an electrochromic layer (17) provided between the first electrode (15) and the second electrode (25) and containing an oxidation coloring-type dye and a reduction coloring-type dye.

3 Claims, 4 Drawing Sheets

(56) References Cited

OTHER PUBLICATIONS

Arakawa et al., "Actual Gratzel Cell Making", CMC Technical Library 267, 2007, pp. 44-49.

English translation of Official Communication issued in corresponding International Application PCT/JP2011/078794, mailed on Jul. 4, 2013.

* cited by examiner

FIG. 6

DISPLAY DEVICE INCLUDING ELECTROCHROMIC LAYER

TECHNICAL FIELD

The present invention relates to a display device, and particularly to an electrochromic display device.

BACKGROUND ART

In recent years, electrochromic display devices have been actively developed (for example, Patent Literature 1). Electrochromic display devices are characterized by wider viewing angles and lower operating voltages than liquid crystal display devices. The electrochromic display devices include electrochromic materials and perform display using oxidation-reduction reactions of the electrochromic materials. The oxidation-reduction reactions of the electrochromic materials are referred to as "electrochromic reactions".

Patent Literature 1 discloses an electrochromic display device improved in response characteristic. An oxidation coloring-type dye is used as the electrochromic material. The oxidation coloring-type dye is formed between a display electrode (anode electrode) and a counter electrode (cathode electrode) facing the display electrode.

CITATION LIST

Patent Literature

PTL 1: Japanese Unexamined Patent Application Publication No. 5-98251

SUMMARY OF INVENTION

Technical Problem

However, the electrochromic display device disclosed in Patent Literature 1 includes only the oxidation coloring-type dye as the electrochromic material. Such an electrochromic display device produces a reaction (reduction reaction) not contributing to display on the counter electrode apart from a coloring reaction (oxidation reaction) of the oxidation coloring-type dye contributing to display. Specifically, for example, the oxidation coloring-type dye in a colored state is put into a decolored state by reduction, or hydrogen is generated by reduction of hydrogen ions. Further, the oxidation coloring-type dye not in a colored state may be over-reduced. In particular, when the oxidation coloring-type dye is a styryl dye, another material is produced by a reaction other than a reaction contributing to coloring, or the dye is broken by over-reduction, thereby causing low cycling durability. Therefore, the electrochromic display device has the problem of gradually producing a remaining color during decoloring and decreasing color reproducibility (color lightening) during coloring.

The present invention has been achieved in consideration of the above-mentioned matters, and an object of the present invention is to provide an electrochromic display device improved in cycling durability.

Solution to Problem

A display device according to the present invention includes a first substrate, a second substrate facing the first substrate, a first electrode formed on the first substrate, a second electrode formed on the second substrate, and an electrochromic layer provided between the first electrode and the second electrode and containing an oxidation coloring-type dye and a reduction coloring-type dye.

According to an embodiment, the display device further includes a first semiconductor nanoelectrode formed on the first electrode and composed of semiconductor nanoparticles, and a second semiconductor nanoelectrode formed on the second electrode and composed of semiconductor nanoparticles, the oxidation coloring-type dye being adsorbed to the first semiconductor nanoelectrode, and the reduction coloring-type dye being adsorbed to the second semiconductor nanoelectrode.

According to an embodiment, the first and second semiconductor nanoelectrodes are composed of titanium oxide nanoparticles.

According to an embodiment, the semiconductor nanoparticles of the first and second semiconductor nanoelectrodes each independently have a size of 1 nm or more and 100 nm or less.

Advantageous Effects of Invention

According to the present invention, an electrochromic display device improved in cycling durability is provided.

BRIEF DESCRIPTION OF DRAWINGS

FIG. 5(*a*) is a schematic cross-sectional view of one pixel of a display device 100B according to another embodiment of the present invention, and FIG. 5(*b*) is a cross-sectional view illustrating a modified example of the display device 100B.

DESCRIPTION OF EMBODIMENTS

Electrochromic (EC) display devices 100A and 100B according to embodiments of the present invention are described below with reference to the drawings. The present invention is not limited to the embodiments illustrated.

Figure 1:
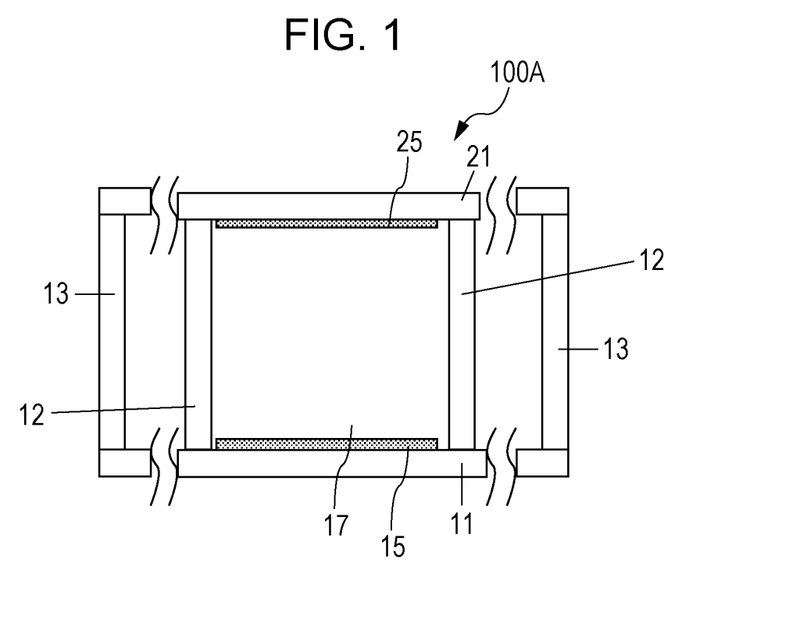
FIG. 1 is a schematic cross-sectional view of one pixel of a display device 100A according to an embodiment of the present invention.

The EC display device 100A according to an embodiment of the present invention is described with reference to FIG. 1. FIG. 1 is a schematic cross-sectional view of one pixel of the EC display device 100A.

The EC display device 100A shown in FIG. 1 includes a first substrate (for example, a glass substrate) 11, a second substrate (for example, a glass substrate) 21 facing the first substrate 11, and an EC layer 17 provided between the first substrate 11 and the second substrate 21. Transparent electrodes 15 and 25 composed of, for example, ITO (Indium Tin Oxide), are formed on the first substrate 11 and the second substrate 21, respectively. The EC layer 17 is provided between the transparent electrode 15 and the transparent electrode 25. Further, pixels are isolated from each other by resin walls 12. The resin walls 12 are made of, for example, an ultraviolet curable resin or a thermosetting resin. Further, outer edge resin walls 13 are formed at substantially the outer edge between the first substrate 11 and the second substrate 21, for example, so as to prevent leakage of an electrolytic solution of the EC layer 17 to the outside. The outer edge resin walls 13 are made of an ultraviolet curable resin or a thermosetting resin. When the EC layer 17 includes, for example, a solid electrolyte, the outer edge resin walls 13 need not be formed.

The EC layer 17 includes an oxidation coloring-type dye and a reduction coloring-type dye. When a direct-current voltage is applied to the EC layer 17 through the transparent electrodes 15 and 15, the EC layer 17 is brought into a colored state. When a direct-current voltage is not applied to the EC layer 17, the EC layer 17 is brought into a decolored state. The EC layer 17 further includes an electrolyte. The electrolyte may be used as an electrolytic solution of the electrolyte dissolved in a solvent or may be a solid electrolyte. Also, a gel electrolyte may be used. The solvent of the electrolytic solution is preferably an organic solvent.

The oxidation coloring-type dye in a decolored state without a voltage applied is brought into a colored state by oxidation reaction, and the oxidation coloring-type dye in a colored state is brought into a decolored state by reduction reaction. On the other hand, the reduction coloring-type dye in a decolored state without a voltage applied is brought into a colored state by reduction reaction, and the reduction coloring-type dye in a colored state is brought into a decolored state by oxidation reaction. The oxidation-reduction reaction of any one of the dyes is reversible.

When a direct-current voltage is applied to the EC layer 17 including the oxidation coloring-type dye and the reduction color-type dye, the oxidation coloring-type dye is brought into a colored state on the anode electrode side of the transparent electrodes 15 and 25, while the reduction coloring-type dye is brought into a colored state on the cathode electrode side of the transparent electrodes 15 and 25. Therefore, both the oxidation coloring-type dye and the reduction coloring-type dye are brought into a colored state, thereby improving color reproducibility (deep color) as compared with the EC display device disclosed in Patent Literature 1. In addition, a coloring reaction of the reduction coloring-type dye takes place on the cathode electrode side, and thus a reaction (for example, reaction to generate hydrogen by reduction of hydrogen ions) not contributing to display little occurs. Further, a reaction to bring the oxidation coloring-type dye in a colored state into a decolored state by reduction little occurs. Also, over-reduction reaction does not take place to prevent deterioration in the dyes. Therefore, cycling durability of the EC display device 100A is enhanced, and color reproducibility is good.

Figure 2:
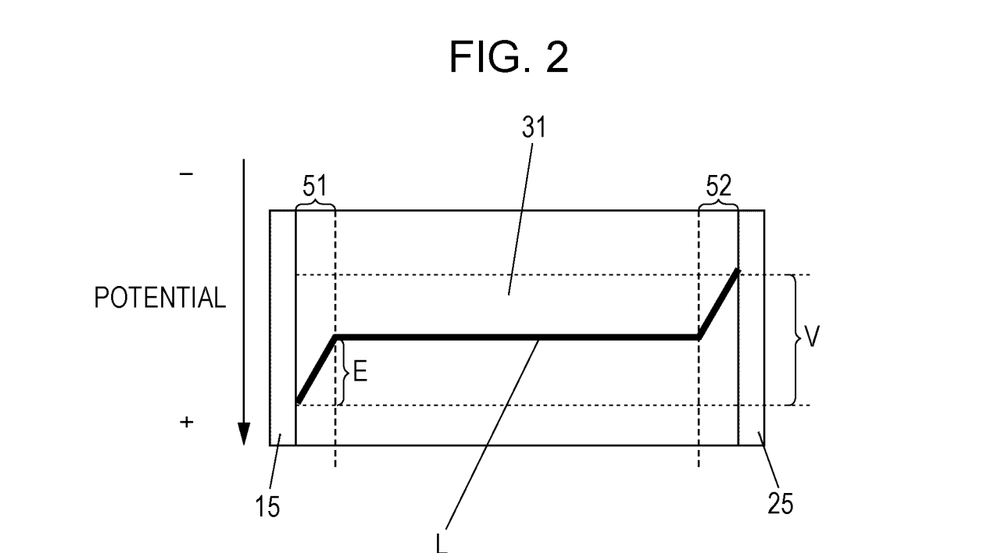
FIG. 2 is a drawing illustrating gradation control of the electrochromic display device 100A and schematically showing a potential distribution between a transparent electrode 15 and a transparent electrode 25.

FIG. 2 is a drawing illustrating gradation control of the electrochromic display device 100A and schematically showing a potential distribution between the transparent electrode 15 and the transparent electrode 25.

In the EC display device 100A, gradation of display can be controlled by changing the direct-current voltage applied. When a voltage V is applied between the transparent electrodes 15 and 25, a potential profile L as shown in FIG. 2 is provided. For example, electric double layers 51 and 52 are formed near the anode electrode 15 and the cathode electrode 25, respectively. On the anode electrode 15, the oxidation coloring-type dye reacts according to reaction formula (I) below.

$$p \text{ Red (reduced substance)} \Leftrightarrow q \text{ Ox (oxidized substance)} + n\ e- \tag{1}$$

In the formula, p, q, and n are each a constant. Further, Red (reduced substance) is in a colorless state, and Ox (oxidized substance) is in a colored state.

In addition, a potential difference E produced by the electric double layer 51 near the anode electrode 15 satisfies equation (2) below.

$$E = E_0 + RT/nF \times ln([Ox]^q/[Red]^p) \tag{2}$$

In the equation, $E_0$ represents a standard oxidation-reduction potential (constant) of a dye; R, a gas constant; T, an absolute temperature (K); F, Faraday constant; [Red], a concentration of a reduced substance near an electrode (for example, near the anode electrode 15); and [Ox], a concentration of an oxidized substance near an electrode (for example, near the anode electrode 15). The equation (2) is called the "Nernst's equation".

The terms other than [Red] and [Ox] on the right side of the Nernst's equation (2) at a certain temperature are constants. As the voltage applied between the anode electrode 15 and the cathode electrode 25 is increased, E is increased. When E is increased, [Ox] is increased and [Red] is decreased according to the Nernst's equation (2). Therefore, the concentration of a dye in a colored state is increased, and thus color gradation of the EC layer 17 can be changed. Thus, a gray-scale display can be realized by controlling the magnitude of the applied voltage and changing the concentrations of colored and colorless dyes.

Examples of the oxidation coloring-type dye include organic materials, inorganic materials, and metal complex materials. Preferred usable examples of the organic materials include a styryl dye and ferrocene. Usable examples of the inorganic materials include NiO (nickel oxide), $Cr_2O_3$ (chromium(III) oxide), $MnO_2$ (manganese dioxide), and CoO (cobalt oxide). Usable examples of the metal complex materials include Prussian blue and a tungsten-oxalic acid complex.

Preferred usable examples of the reduction coloring-type dye include organic materials and inorganic materials. Usable examples of the organic materials include phthalic acid ester derivative dyes and viologen dyes. Preferred usable examples of the inorganic materials include $WO_3$ (tungsten(VI) oxide), $MoO_3$ (molybdenum trioxide), $V_2O_5$ (vanadium pentaoxide), $Nb_2O_5$ (niobium pentaoxide), and $TiO_2$ (titanium oxide).

The electrolyte is preferably, for example, tetrabutylammonium perchlorate (TBAP), and in this case, the solvent is preferably a polar organic solvent. The electrolyte is not limited to tetrabutylammonium perchlorate (TBAP), and for example, a quaternary ammonium salt, a lithium salt, or potassium chloride can be used. Examples of the quaternary ammonium salt include tetraethylammonium tetrafluoroborate and triethylmethylammonium tetrafluoroborate. For example, a lithium perchlorate can be used as the lithium salt. An anion constituting the electrolyte is preferably an alkali metal ion or quaternary alkylammonium ion, and a cation is preferably a halide ion. The exemplified electrolytes are easily dissolved in an organic solvent, and high electric conductivity can be achieved.

The solvent is preferably a polar organic solvent, and either an aprotic polar organic solvent or protic polar organic solvent may be used. The aprotic polar organic solvent used is a nitrile-, carbonate-, or ketone-based polar organic solvent or another aprotic polar organic solvent. The protic polar organic solvent used is an alcoholic organic solvent. The nitrile-based organic solvent is preferably acetonitrile or benzonitrile. The carbonate-based organic solvent is preferably ethylene carbonate or propylene carbonate. The ketone-based organic solvent is preferably acetone. The other aprotic polar organic solvent is preferably dimethylformaldehyde, dimeth- ylsulfoxide, propylene carbonate, ethylene carbonate, or γ-butyrolactone. The alcoholic organic solvent is preferably methanol or ethanol. The exemplified organic solvents sufficiently dissolve the above-described dyes. Further, by using the electrolytic solution containing the exemplified organic solvent, dye, and electrolyte, a wide potential window can be produced.

Also, a solid electrolyte can be used. In this case, the solvent need not be used.

The first and second substrates 11 and 21 may be plastic substrates. The transparent electrodes 15 and 25 may be made of FTO (Fluorine-doped Tin Oxide).

Figure 3:
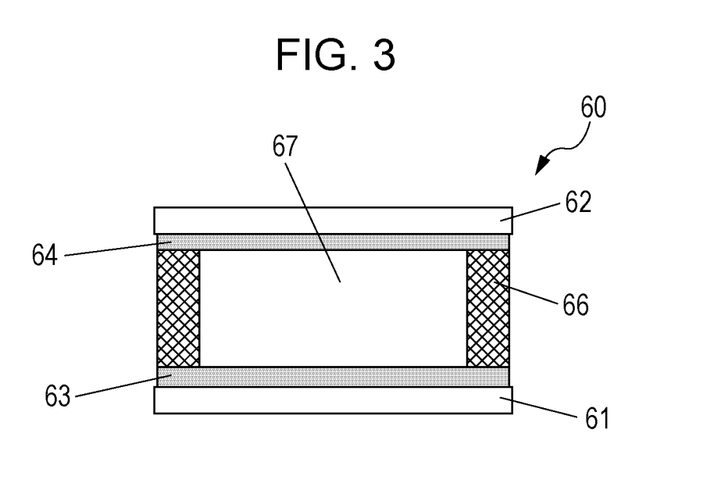
FIG. 3 is a schematic cross-sectional view of an electrochromic (EC) cell sample 60 used in an experiment.

Next, an example of experimental results of research conducted by the inventors of the present invention is described with reference to FIG. 3. FIG. 3 is a schematic cross-sectional view of an electrochromic (EC) cell sample 60 used in an experiment. The sample 60 includes glass substrates 61 and 62, the two glass substrates 61 and 62 being bonded together with a sealing agent (for example, a thermosetting resin) 66. The sealing agent 66 contains plastic beads (hereinafter referred to as "beads") having a diameter of 100 μm. Although not shown in FIG. 3, the sample 60 has an injection port sealed with an ultraviolet curable resin. A transparent electrode 63 is formed on the glass substrate 61, and a transparent electrode 64 is formed on the glass substrate 62. Specifically, the transparent electrodes 63 and 64 are made of ITO and each have a thickness of 100 nm. The space between the glass substrate 61 and the glass substrate 62 is filled with an electrolytic solution 67. The electrolytic solution 67 contains acetonitrile as a solvent, an oxidation coloring-type dye, a reduction coloring-type dye, and an electrolyte. Specifically, the electrolytic solution contains a styryl dye as the oxidation coloring-type dye at a concentration of 0.025 M/L, a terephthalic acid derivative dye as the reduction coloring-type dye at a concentration of 0.025 M/L, and tetrabutylammonium perchlorate as the electrolyte at a concentration of 0.100 M/L. Each of the dyes is colored magenta during coloring. The cell gap of the sample 60 is about 100 μm.

The styryl dye in the embodiment is, for example, 3,3-dimethyl-2-(P-dimethylaminostyryl)indolino[2,1-b]oxazoline represented by a chemical formula (Chem. 1) below.

[Chem. 1]

The terephthalic acid derivative dye in the embodiment is, for example, dimethyl terephthalate represented by a chemical formula (Chem. 2) below.

[Chem. 2]

A method for forming the sample 60 is briefly described.

First, the sealing agent 66 containing beads is applied so as to form a desired pattern on the glass substrate 61 on which the transparent electrode 63 has been formed. Then, the glass substrate 61 and the glass substrate 62 on which the transparent electrode 64 has been formed are bonded together, and the sealing agent 66 is cured.

Next, the above-described electrolytic solution 67 is injected from the injection port.

Then, the injection port is sealed with the ultraviolet curable resin.

A sample 70 excluding only the reduction coloring-type dye of the sample 60 was prepared as a comparative example.

A voltage was independently applied each of the samples 60 and 70 to repeatedly measure transmittance (Y value (brightness) of transmitted light was calculated from spectral transmittance data at a wavelength of 380 nm or more and 780 nm or less based on JIS Z 8701. In the measurement, the Y value was regarded as transmittance.) A voltage was applied to each of the samples 60 and 70 using a potentiostat up to 100 cycles each performed under conditions in which a voltage of 0 V was maintained for 5 seconds, and then a voltage of 3 V was applied for 3 seconds. During the cycles, transmittance (T) of each of the samples was measured without the voltage applied. The results are shown in FIG. 4.

Figure 4:
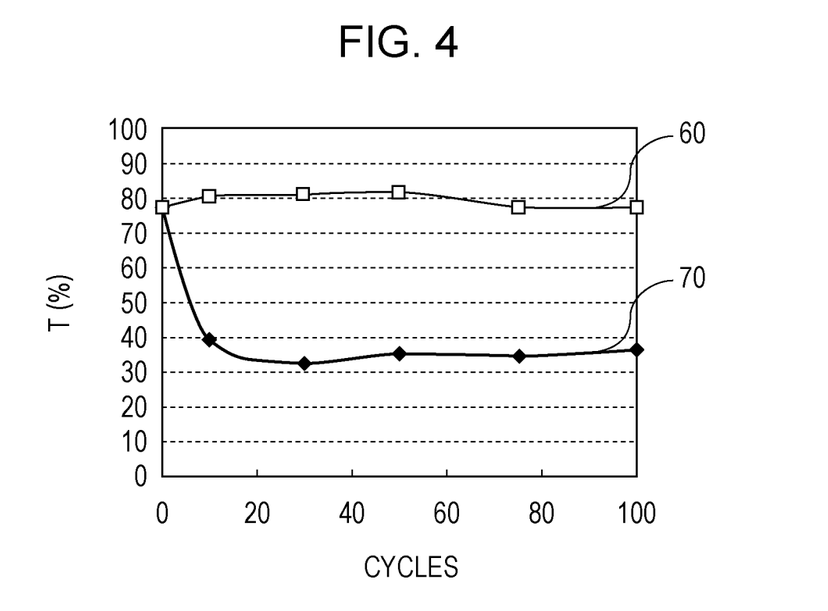
FIG. 4 is a graph showing evaluation results of cycling durability of an EC cell used in an experiment, in which a number of cycles is shown on the abscissa, and transmittance (T) is shown on the ordinate.

FIG. 4 is a graph showing evaluation results of cycling durability of the electrochromic (EC) cell used in the experiment, in which the number of cycles is shown on the abscissa, and transmittance (T) is shown on the ordinate.

FIG. 4 reveals that the sample 60 of the example shows no decrease in transmittance even when the voltage is repeatedly applied. The sample 70 of the comparative example shows decreases in transmittance when the voltage is repeatedly applied. It is considered that the sample 60 includes the oxidation coloring-type dye and the reduction coloring-type dye and thus little produces a reaction not contributing coloring and has higher cycling durability than the sample 70.

Next, an EC display device 100B having the same effect as the EC display device 100A is described with reference to FIG. 5(a), FIG. 5(b), and FIG. 6. Constituent elements common to the EC display device 100A are denoted by the same reference numerals and duplicated description is avoided.

Figure 5:
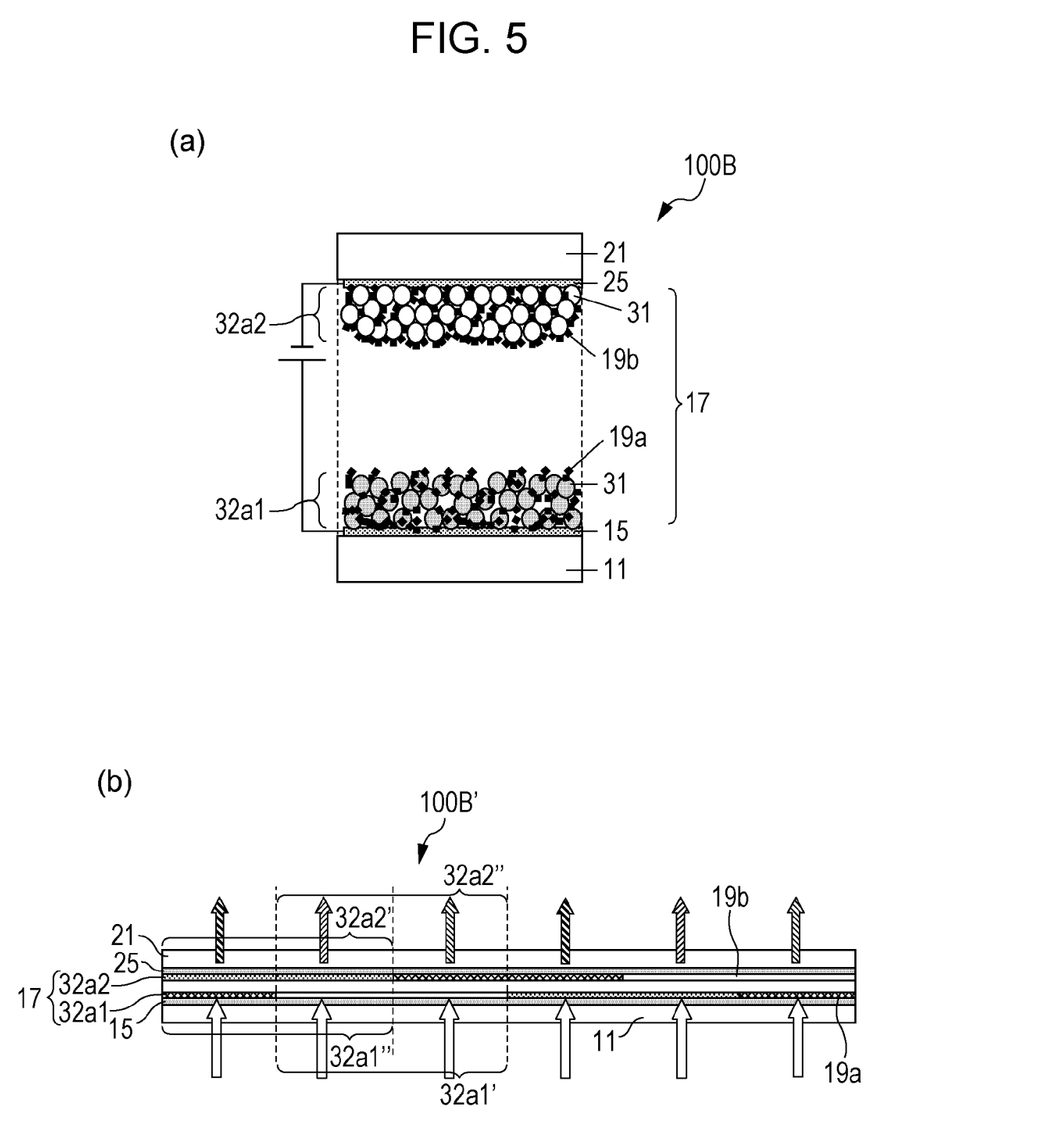

The EC display device 100B shown in FIG. 5(a) has a structure in which a semiconductor nanoelectrode (an aggregate of semiconductor nanoparticles 31 may be referred to as a "semiconductor nanoelectrode 31") composed of semiconductor nanoparticles is formed on each of the transparent electrodes 15 and 25, an oxidation coloring-type dye 19a is adsorbed to the semiconductor nanoelectrode 31 on the transparent electrode 15 side (anode electrode side), and a reduction coloring-type dye 19b is adsorbed to the semiconductor nanoelectrode 31 on the transparent electrode 25 side (cathode electrode side).

In the EC display device 100B, each of the oxidation coloring-type dye 19a and the reduction coloring-type dye 19b is adsorbed to the semiconductor particles 31 so that pixels are colored in different colors. The EC layer 17 of the EC display device 100B includes an oxidation-type electrochromic layer 32a1 containing the oxidation coloring-type dye 19a and a reduction-type electrochromic layer 32a2 containing the reduction coloring-type dye 19b. When electrochromic dyes of C (cyan), M (magenta), and Y (yellow) are used in pixels, the oxidation coloring-type dye 19a and the reduction coloring-type dye 19b have different light absorption wavelengths in a colored state.

Next, an EC display device 100B' of a modified example of the EC display device 100B is described with reference to FIG. 5(b).

For example, when as in the EC display device 100B' shown in FIG. 5(b), the oxidation coloring-type dye 19a and the reduction coloring-type dye 19b which are different for each two adjacent pixels in a row direction are adsorbed to semiconductor nanoparticles 31 (not shown), the adsorption pitch of the oxidation coloring-type dye 19a and the reduction coloring-type dye 19b can be increased, thereby facilitating production. Specifically, as shown in FIG. 5(b), an electrochromic (EC) layer 17 of the EC display device 100B' includes an oxidation-type electrochromic layer 32a1 containing the oxidation coloring-type dye 19a and a reduction-type electrochromic layer 32a2 containing the reduction coloring-type dye 19b. The oxidation-type electrochromic layer 32a1 has a first oxidation-type electrochromic region 32a1' containing the single oxidation coloring-type dye 19a and extending over two adjacent pixels in the row direction. Similarly, the reduction-type electrochromic layer 32a2 has a first reduction-type electrochromic region 32a2' containing the single reduction coloring-type dye 19b and extending over two adjacent pixels in the row direction. Further, the oxidation-type electrochromic layer 32a1 has a second oxidation-type electrochromic region 32a1" having two portions of oxidation coloring-type dyes 19a having different light absorption wavelengths in a colored state and corresponding to two adjacent pixels in the row direction. Similarly, the reduction-type electrochromic layer 32a2 has a second reduction-type electrochromic region 32a2" having two portions of reduction coloring-type dyes 19b having different light absorption wavelengths in a colored state and corresponding to two adjacent pixels in the row direction. The electrochromic (EC) layer 17 of the EC display device 100B' is formed so that the first oxidation-type electrochromic region 32a1' faces the second reduction-type electrochromic region 32a2", and the first reduction-type electrochromic region 32a2' faces the second oxidation-type electrochromic region 32a1".

In each of the EC display devices 100B and 100B', for example, a switching element (not shown), such as a thin-film transistor or the like, and the transparent electrode 15 (or the transparent electrode 25) are formed in each pixel, and a voltage can be applied to the EC layer 17 for pixels independently of each other. In addition, each of the EC display devices 100B and 100B' can be modified to permit segment driving. Therefore, each of the EC display devices 100B and 100B' can perform gray-scale display for pixels independently of each other, thereby permitting full-color display. Further, when the transparent electrodes 15 and 25 are solid electrodes formed over the entire region of each of the display devices 100B and 100B', a voltage cannot be independently applied to the EC layer 17 for each pixel. Therefore, in this case, for example, a liquid crystal layer and a light modulation layer are preferably separately provided by providing an electrode and a switching element which can apply a voltage to the liquid crystal layer for pixels independently of each other. A detailed description of the light modulation layer is omitted because it is well known.

Figure 6:
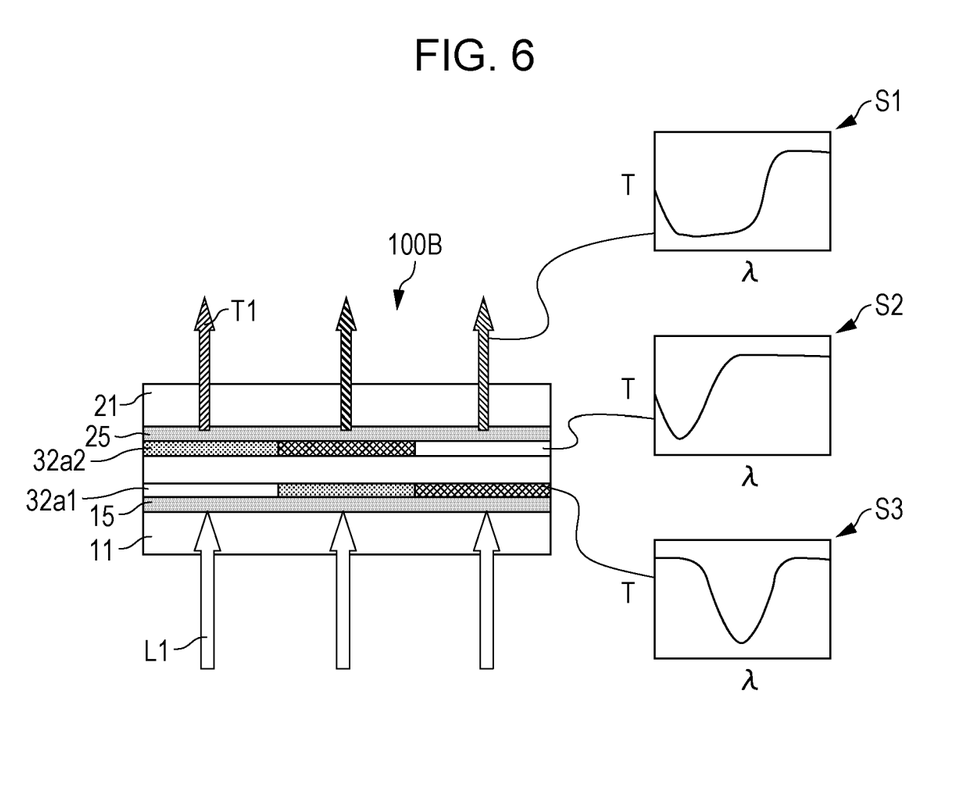
FIG. 6 is a schematic view illustrating a display state of the display device 100B.

Next, FIG. 6 is referred to.

FIG. 6 is a schematic cross-sectional view of the EC display device 100B. In FIG. 6, S1 represents a schematic transmitted light spectrum of light T1 emitted from the display device 100B, S3 represents a schematic absorption spectrum of the oxidation-type electrochromic layer 32a1, and S2 represents a schematic absorption spectrum of the reduction-type electrochromic layer 32a2. L1 represents light incident on the EC display device 100B.

As shown in FIG. 6, the EC layer 17 of the above-described EC display device 100B (and the EC display device 100B') has a two-layer structure including the oxidation-type electrochromic layer 32a1 and the reduction-type electrochromic layer 32a2. Even when in the EC layer 17 having such a two-layer structure, each of the dyes 19a and 19b constituting the oxidation-type electrochromic layer 32a1 and the reduction-type electrochromic layer 32a2, respectively, is a material having one absorption peak, light T1 emitted from the display device 100B can have a spectrum of, for example, R (red), G (green), and B (blue).

The dyes 19a and 19b are often materials each having one absorption peak and are easily colored, in particular, C (cyan), M (magenta), and Y (yellow), but hardly colored R, G, and B. However, when display is performed using three colors with high color purity, the three colors of R, G, and B are preferably used. In the embodiment, the EC layer 17 has the two-layer structure described above, and thus each of the dyes 19a and 19b may be a material colored C, M, and Y, and material selectivity is high. In addition, in the embodiment, the oxidation-type electrochromic layer 32a1 and the reduction-type electrochromic layer 32a2 which have good coloring and decoloring properties are used, and thus desired color display can be realized. In addition, a reaction not contributing coloring little takes place, and thus both the oxidation-type electrochromic layer 32a1 and the reduction-type electrochromic layer 32a2 are colored, thereby exhibiting a high efficiency of utilization of electric energy.

The semiconductor nanoelectrode 31 is made of, for example, $TiO_2$ (titanium oxide) nanoparticles. Besides this, the semiconductor nanoelectrode 31 may be made of, for example, $ZnO_2$ (zinc oxide) nanoparticles or $Al_2O_3$ (aluminum oxide) nanoparticles. The size of the semiconductor nanoparticles 31 is preferably 1 nm or more and 100 nm or less and more preferably 1 nm or more and 50 nm or less. In particular, when the semiconductor nanoparticles 31 have a size of 50 nm or less, visible light Mie scattering by the semiconductor nanoparticles 31 is suppressed, and thus the EC display device 100B has high transparency. Also during decoloring (without a voltage applied), the EC display device 100B has high transparency. The thickness of the semiconductor nanoelectrode 31 is preferably 1 μm or more and 10 μm or less. When the semiconductor nanoelectrode 31 has a thickness exceeding 10 μm, the amount of the dye adsorbed is increased, but transparency of the EC display device 100B is lost. While when the semiconductor nanoelectrode 31 has a thickness of less than 1 μm, the amount of the dye adsorbed is decreased, and the EC display device 100B has poor coloring properties. The semiconductor nanoelectrode 31 has a structure (porous structure) including aggregated nanoparticles and thus has a large surface area. Therefore, a large amount of dye can be adsorbed, thereby improving the coloring properties. Further, the semiconductor nanoelectrode 31 is composed of a semiconductor and thus easily produces an electrochromic reaction due to an efficient flow of electric current contributing coloring.

Since the oxidation coloring-type dye 19a and the reduction coloring-type dye 19b are independently adsorbed to the semiconductor nanoelectrode 31, and thus the oxidation coloring-type dye 19a and the reduction coloring-type dye 19b can be prevented from diffusing. Therefore, power consumption of the EC display device 100B can be decreased more than the EC display device 100A.

Next, a method for producing the semiconductor nanoelectrode 31 and a method for adsorbing the dye to the semiconductor nanoelectrode 31 are briefly described.

The semiconductor nanoelectrode 31 is formed by applying, for example, titanium oxide paste on a substrate by, for example, a screen printing method, a doctor blade method, a squeegee method, or a spin coating method, or applying a titanium oxide powder on the substrate by an electrophoretic deposition method, and then firing the coating under the conditions of a temperature of 450° C. to 500° C. and a time of 30 minutes to 120 minutes. If required, patterning may be performed by masking or photolithography. The titanium oxide paste may be a commercial product or may be produced by a sol-gel method (refer to CMC Technical Library 267, p. 45). The titanium oxide powder may be a commercial product.

After the semiconductor nanoelectrode 31 is formed by the above-described method, each of the oxidation coloring-type dye 19a and the reduction coloring-type dye 19b is chemically adsorbed to a desired region of a surface of the semiconductor nanoelectrode 31. The method for adsorbing each of the dyes is preferably, for example, a natural adsorption method (method of immersing the semiconductor nanoelectrode 31 in a solution of each dye), a vacuum deposition method, or an ink jet method.

Like the semiconductor device 100A, the semiconductor device 100B has excellent cycling durability because the EC layer 17 includes the oxidation coloring-type dye and the reduction coloring-type dye.

According to an embodiment of the present invention, an electrochromic display device having improved cycling durability can be provided.

INDUSTRIAL APPLICABILITY

A display device according to the present invention is preferably used for various electronic apparatuses such as portable apparatuses, for example, a cellular phone, a pocket game machine, PDA (Personal Digital Assistants), a portable TV, a remote control, a notebook-size personal computer, other portable terminals, etc.

REFERENCE SIGNS LIST 11, 21 substrate
12 resin wall
13 outer edge resin wall
15, 25 transparent electrode
17 electrochromic layer

The invention claimed is:
1. A display device, comprising:
a first substrate;
a second substrate facing the first substrate;
a first electrode formed on the first substrate;
a second electrode formed on the second substrate;
an electrochromic layer provided between the first electrode and the second electrode and containing an oxidation coloring-type dye and a reduction coloring-type dye;
a first semiconductor nanoelectrode formed on the first electrode and composed of semiconductor nanoparticles; and
a second semiconductor nanoelectrode formed on the second electrode and composed of semiconductor nanoparticles, wherein
the oxidation coloring-type dye is adsorbed to the first semiconductor nanoelectrode, and the reduction coloring-type dye is adsorbed to the second semiconductor nanoelectrode,
the electrochromic layer includes an oxidation-type electrochromic layer containing the oxidation coloring-type dye, and a reduction-type electrochromic layer containing the reduction coloring-type dye,
the oxidation coloring-type dye and the reduction coloring-type dye in a pixel have different light absorption wavelengths in a colored state,
the oxidation-type electrochromic layer includes a first oxidation-type electrochromic region containing a single oxidation-type coloring material and extending over two adjacent pixels in a row direction,
the reduction-type electrochromic layer includes a first reduction-type electrochromic region containing a single reduction-type coloring material and extending over two adjacent pixels in a row direction,
the oxidation-type electrochromic layer includes a second oxidation-type electrochromic region which has two portions of oxidation-type coloring materials having different light absorption wavelengths in a colored state and corresponding to two adjacent pixels in the row direction,
the reduction-type electrochromic layer includes a second reduction-type electrochromic region which has two portions of reduction-type coloring materials having different light absorption wavelengths in a colored state and corresponding to two adjacent pixels in the row direction, and
the electrochromic layer is formed so that the first oxidation-type electrochromic region faces the second reduction-type electrochromic region, and the first reduction-type electrochromic region faces the second oxidation-type electrochromic region.

2. The display device according to claim 1, wherein the semiconductor nanoparticles of the first and second semiconductor nanoelectrodes each independently have a size of 1 nm or more and 100 nm or less.

3. The display device according to claim 1, wherein the first and second semiconductor nanoelectrodes are composed of titanium oxide nanoparticles.

* * * * *